(12) United States Patent
Liao

(10) Patent No.: US 6,935,686 B1
(45) Date of Patent: Aug. 30, 2005

(54) MOUNTING DEVICE FOR AN INFANT'S SAFETY CHAIR

(76) Inventor: Huang-Kuo Liao, No. 411, Kuo Chung Road, Tali City, Taichung Hsien (TW)

( * ) Notice: Subject to any disclaimer, the term of this patent is extended or adjusted under 35 U.S.C. 154(b) by 0 days.

(21) Appl. No.: 10/887,074

(22) Filed: Jul. 8, 2004

(51) Int. Cl.$^7$ ................................................. A47C 1/08
(52) U.S. Cl. .................. 297/252; 297/250.1; 297/255; 248/500; 248/503.1
(58) Field of Search ............................. 297/252, 250.1, 297/255; 248/500, 503.1, 222.11

(56) References Cited

U.S. PATENT DOCUMENTS

| | | | |
|---|---|---|---|
| 1,577,807 A | * | 3/1926 | Orwick ........................ 297/134 |
| 2,694,441 A | * | 11/1954 | Degenfelder ................ 297/17 |
| 3,594,039 A | * | 7/1971 | Harp .......................... 297/252 |
| 4,432,525 A | * | 2/1984 | Duvall ......................... 248/430 |
| 6,267,441 B1 | * | 7/2001 | Otero .......................... 297/254 |

* cited by examiner

Primary Examiner—Laurie K. Cranmer
(74) Attorney, Agent, or Firm—Alan D. Kamrath; Nikolai & Mersereau, P.A.

(57) ABSTRACT

A mounting device for an infant's safety chair has at least two holding frames and a bracket. Each holding frame has an attaching base secured under the infant's safety chair and a U-shaped tube slidably and rotatably mounted on the attaching base. The U-shaped tube is composed of multiple sections adjustably connected with each other. The bracket is a U-shaped strip secured under the infant's safety chair to hold the U-shaped tube when the holding frame is pressed down parallel with a bottom face of the infant's safety chair. By adjusting the sections, the U-shaped tube can be clamped to an original adult's seat even in different vehicles to provide an excellent positioning efficiency to the infant's safety chair.

7 Claims, 5 Drawing Sheets

MOUNTING DEVICE FOR AN INFANT'S SAFETY CHAIR

BACKGROUND OF THE INVENTION

1. Field of the Invention

The present invention relates to a mounting device, and more particularly to a mounting device for holding an infant's safety chair conveniently and stably inside a vehicle.

2. Description of Related Art

When an infant is seated in a vehicle, an infant's safety chair is important to keep the infant safe from being thrown around by the motion of the vehicle. Arrangement of the infant's safety chair is divided into two types, one is "forward facing" and the other is "backward facing". The "forward facing" arrangement is to place the chair in the same orientation with an original adult seat inside the vehicle so that the infant faces forward. The "backward facing" arrangement is to place the car in an opposite orientation with the original adult seat to make the infant face backward. The "backward facing" arrangement is preferred because the infant, particularly its face, can be easily observed by someone sitting adjacent the safety chair.

A conventional infant's safety chair for the "backward facing" arrangement is shown in FIG. 5, which is mounted on an adult seat (60) inside the vehicle. The conventional infant's safety chair comprises a base (53) and a chair (50) composed of a backrest (52) and a seat body (51). The base (53) is attached under the seat body (51) and is directly placed on a seat body (61) of the adult seat (60). The backrest (52) has a through hole (522) defined near joint between the backrest (52) and the seat body (51). Only one securing means is applied to the conventional infant's safety chair. As shown in FIG. 5, a seat belt (63) of the adult seat (60) is pulled forward and then penetrates the through hole (522) to detachably attach with a buckle (not shown). Therefore, the infant's safety chair (50) is combined with the adult seat (60).

However, the conventional infant's safety chair easily swings or inclines to the front of the car when the vehicle is subjected to emergency braking because the seat belt (63) can not tie the infant's safety chair firmly to the floor of the car. Those dangerous situations may frighten the infant or even result in neck injuries to the vulnerable infant.

The present invention has arisen to mitigate or obviate the drawbacks of the conventional infant's safety chair.

SUMMARY OF THE INVENTION

The main objective of the present invention is to provide a mounting device for a chair that stably holds the chair on an adult seat in a vehicle.

Further benefits and advantages of the present invention will become apparent after a careful reading of the detailed description with appropriate reference to the accompanying drawings.

DETAILED DESCRIPTION OF THE PREFERRED EMBODIMENT

A mounting device for an infant's safety chair in accordance with the present invention comprises at least two holding frames and at least one bracket. Each holding frame has an attaching base secured under the infant's safety chair and a U-shaped tube slidably and rotatably mounted on the attaching base. The U-shaped tube is composed of multiple sections adjustably connected with each other. The bracket is a U-shaped strip secured under the infant's safety's chair to hold the U-shaped tube when the holding frame is pressed down parallel with a bottom face of the infant's seat. By adjusting the sections, the U-shaped tube is enabled to clamp an original seat body of the adult seat even in different vehicles to provide excellent and convenient positioning efficiency to the conventional infant's safety seat.

Figure 1:
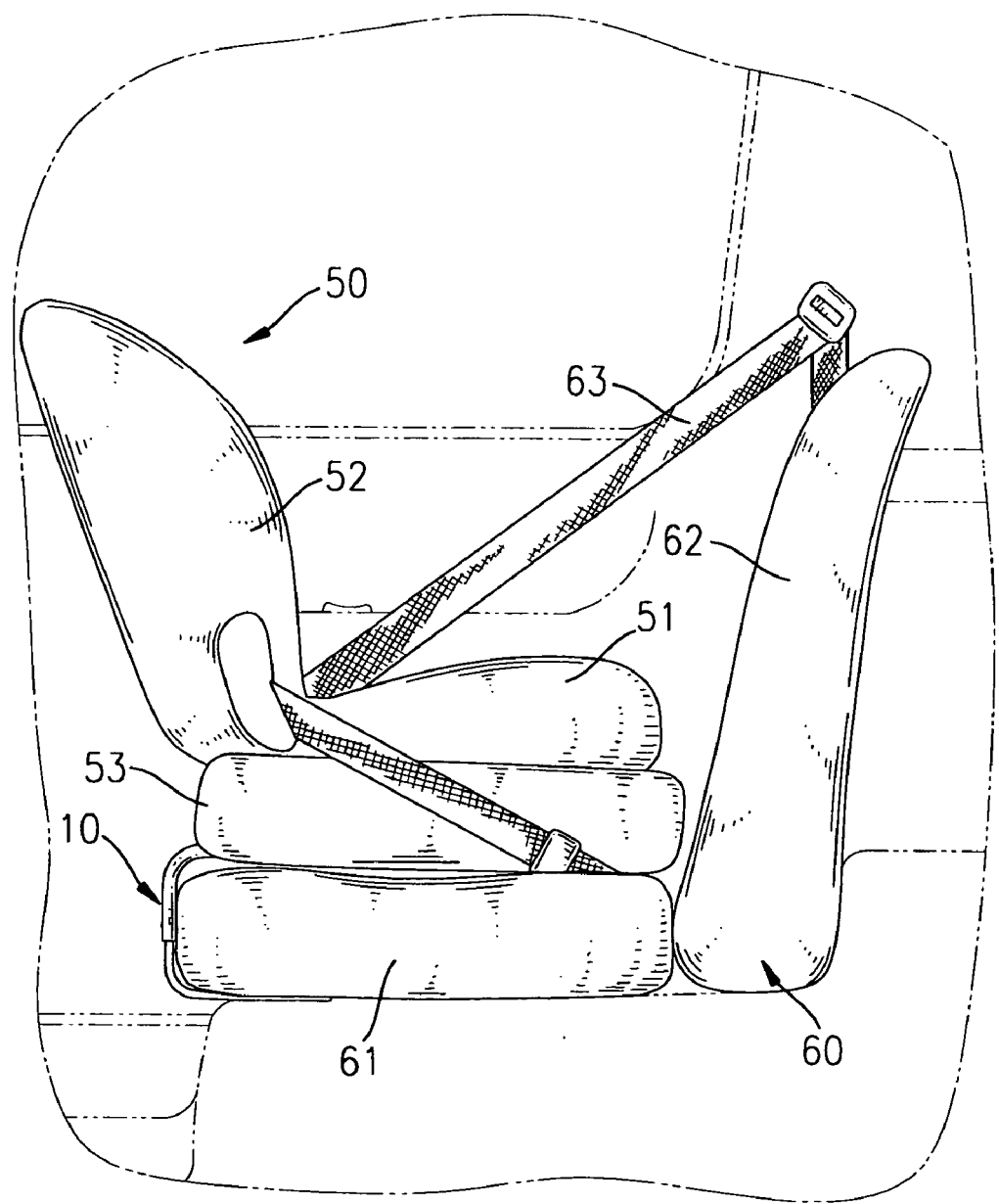
FIG. 1 is a side plane view of a mounting device for a in infant's safety chair in accordance with the present invention, wherein the mounting device is attached under a conventional infant's safety chair in accordance with the prior art.
Figure 2:
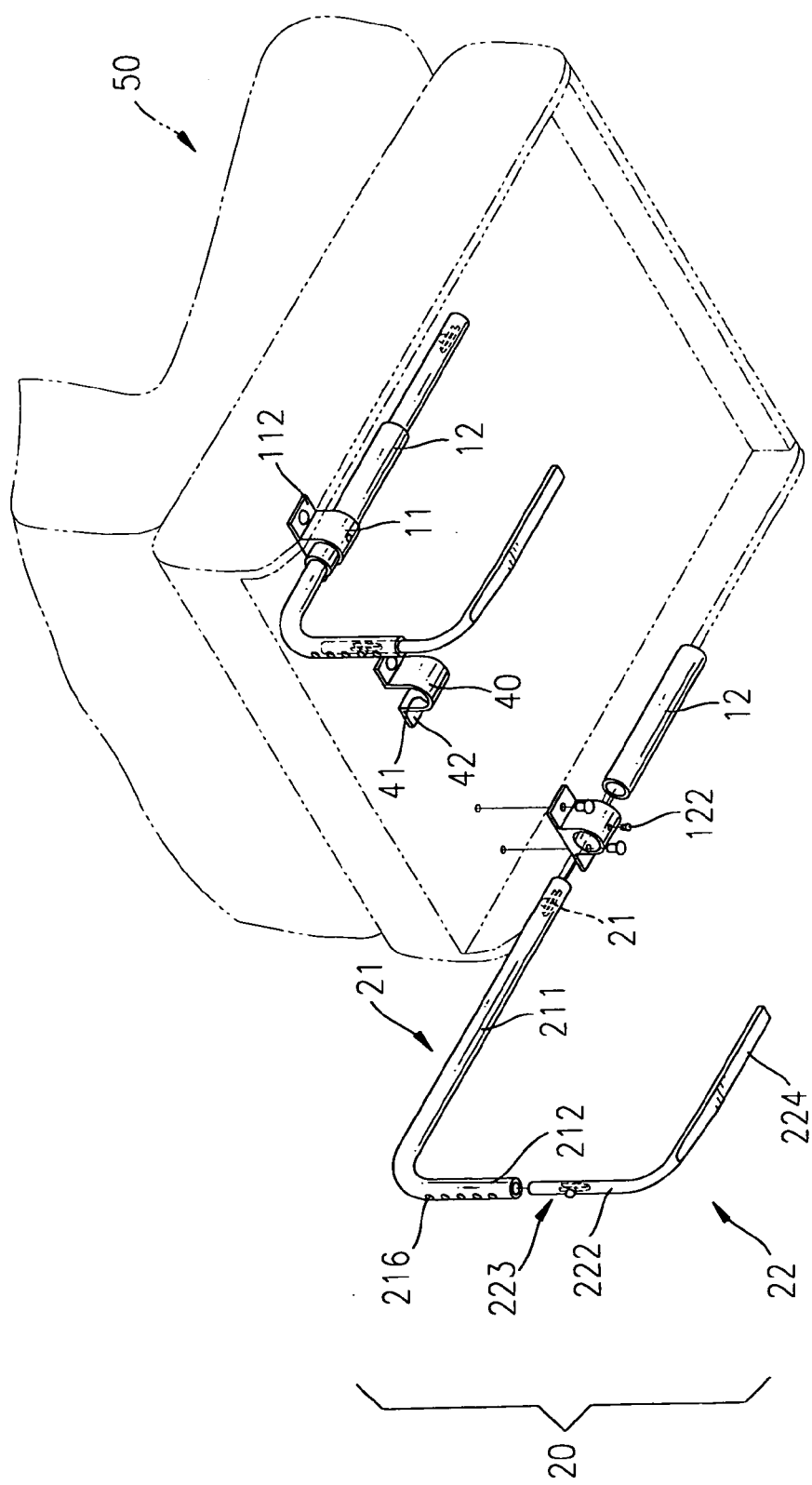
FIG. 2 is an exploded perspective view of the mounting device that substantially comprises two holding frames and a bracket.
Figure 3:
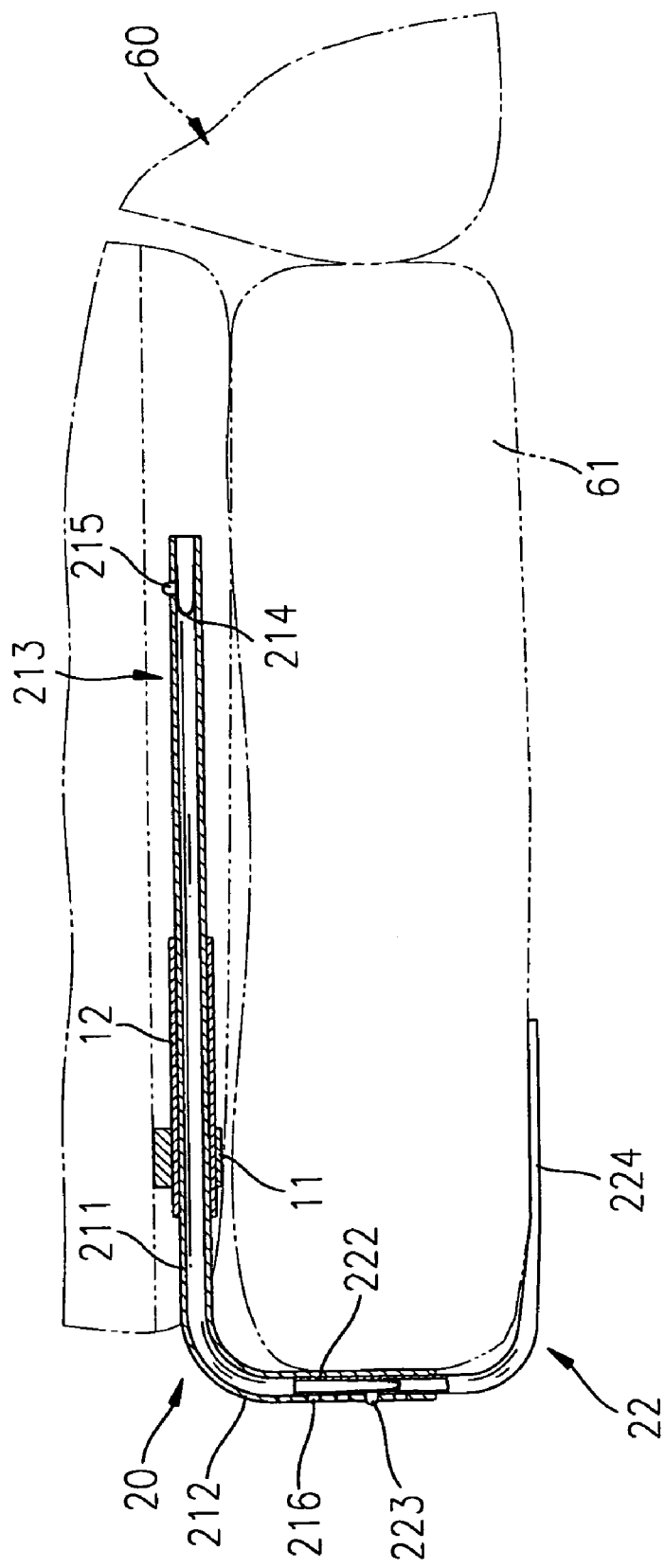
FIG. 3 is a cross-sectional side plane view of one holding frame that is assembled.

With reference to FIGS. 1 to 3, a preferred embodiment of the mounting device for an infant's safety chair in accordance with the present invention comprises substantially two holding frames (10) and a bracket (40).

The two holding frames (10) are respectively attached under the infant's seat at two sides. Each of the two holding frames (10) comprises an attaching base (11), a sleeve (12), and a multi-sectional U-shaped tube (20). The attaching base (11) is a U-shaped bracket with a recess (not numbered) and two ears (112) that are firmly attached to a bottom face of the infant's safety seat by means of screws. The sleeve (12) is a short tube immovably engaged with the attaching base (11) inside the recess by a rivet (122) extending from the attaching base (11) to the sleeve (12). Preferably, the sleeve (12) mounted on the attaching base (11) keeps a distance with the bottom face of the infant's safety seat (50).

The multi-sectional U-shaped tube (20) is composed of an L-shaped connecting tube (21) and an L-shaped adjusting tube (22).

The L-shaped connecting tube (21) has a long section (211) and a short section (212). The long section (211) of the connecting tube (21) penetrates the sleeve (12) and has a distal end and a resilient latch (213) attached on the distal to prevent the connecting tube (21) escaping from the sleeve (12). The resilient latch (213) is composed of a V-strip spring (214) accommodated inside the connecting tube (21) and a nub (215) formed on a distal end of the V-strip spring (214). The nub (215) is pushed by the V-strip spring (214) to partially emerge out of the long section (211) to serve as a stop to prevent the connecting tube (21) escaping from the sleeve (12). Wherein, the distance between the sleeve (12) and the bottom face of the infant's safety chair prevent the nub (215) from scratching with the bottom face when the connecting tube (21) rotates. The short section (212) connects with the adjusting tube (22) and has multiple locking holes (216) longitudinally defined on the short section (212) in a line.

The adjusting tube (22) is movably connected with the connecting tube (21) and has an insertion end (222) and an abutting end (224). The insertion end (222) is a round tube to movably insert into the short section (212) of the connecting tube (21) and has a resilient latch (223) to operationally engage with one corresponding locking hole (216), wherein the resilient latch (223) on the insertion end has the same structure with the prior one. The abutting end (224) is shaped into flat strip to make the abutting end (224) match with a bottom face of the adult seat (60). By adjusting the resilient latch (223) to engage with different locking holes, the height of the holding frame (10) is enabled to be adjusted to cooperate with different adult seats (60).

Figure 4:
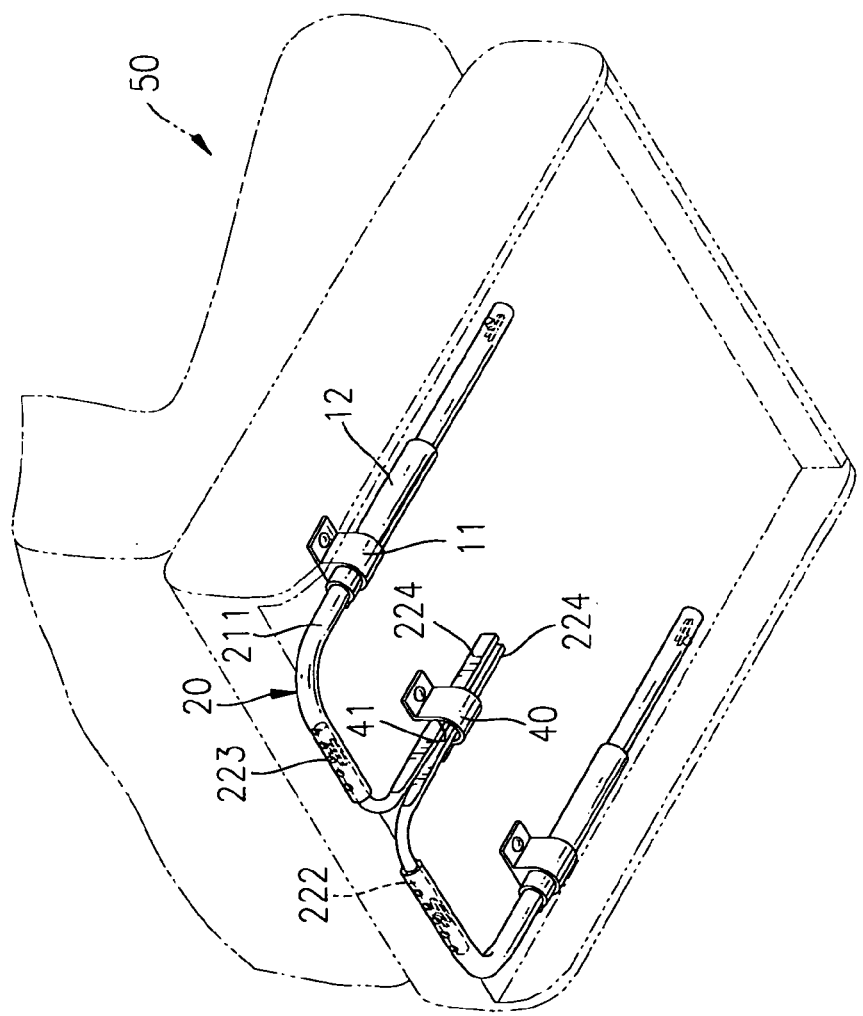
FIG. 4 is an assembled perspective view of elements of the mounting device for an infant's safety chair shown in FIG. 2.
Figure 5:
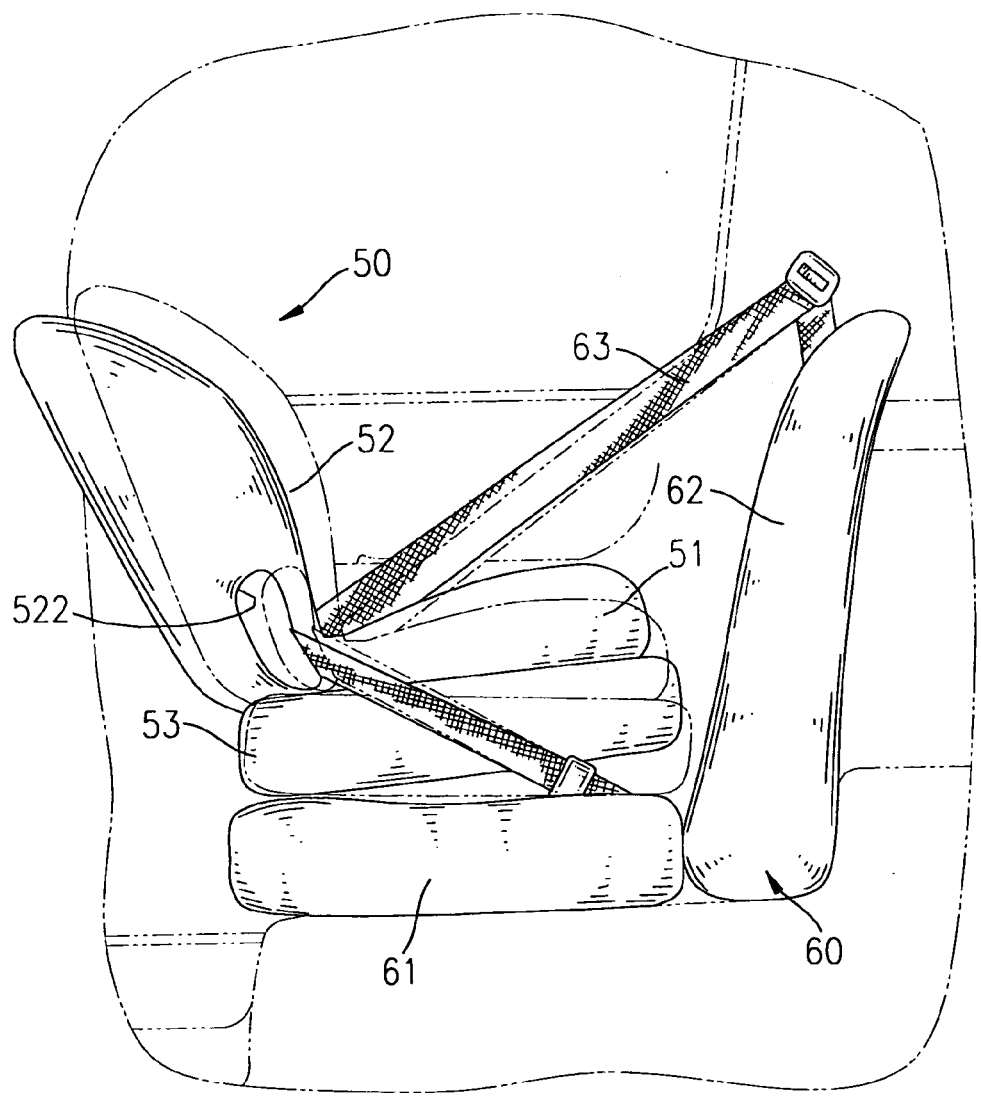
FIG. 5 is an operationally side plane view of the conventional infant's safety chair in accordance with the prior art.

The bracket (40) is attached to the bottom face of the chair between the two holding frames (10) and is also a U-shaped strip with a recess (41) and two ears (42) attached to the bottom face by same means of screws in the prior description of the attaching base (11). However, the recess (41) is more than twice as wide as the recess in the attaching base (11). With reference to FIG. 4, when the infant's safety chair is not in use, the two multi-sectional U-shaped tubes (20) have to be pulled outward until the abutting ends (224) are enabled to exit the through hole (41). Then, the two multi-sectional U-shaped tubes (20) respectively pivot toward to the bracket (40) at the long section (211) of the connecting tube (21) to lastly push the abutting ends (224) to penetrate the recess (41) of bracket (40). Thereby, the two holding frames (10) are folded to diminish the storage space occupied by the mounting device.

According to the above description, the mounting device for an infant's safety chair of the present invention has the following advantages:

1. The mounting device attached under the infant's safety chair provides a sufficient holding efficiency so that the infant's seat is enabled to keep steady whereby the infant sitting inside is comfortable and safe.

2. The mounting device for an infant's safety chair in the present invention is convenient in attachment and storage. Moreover, the height of the holding frame (10) can be adjusted to operationally match different adult seats.

Although the invention has been explained in relation to multiple preferred embodiments, many other possible modifications and variations can be made without departing from the spirit and scope of the invention as hereinafter claimed.

What is claimed is:

1. A mounting device for an infant's safety chair comprising:
   at least two holding frames (10) adapted to attached under a bottom face 4 of the infant's safety chair, each holding frame comprising:
      an attaching base (11) being a U-shaped bracket with a recess and two ears (112) adapted to attach to the bottom face of the infant's safety chair;
      a sleeve (12) immovably received inside the recess of the attaching base (11);
      a multi-sectional U-shaped tube (20) slidably and rotatably received in the sleeve (12) and composed of an L-shaped connecting tube (21) and an L-shaped adjusting tube (22) adjustably connected to the L-shaped connecting tube (21).

2. The mounting device as claimed in claim 1, wherein the L-shaped connecting tube (21) comprises
   a long section (211) penetrating the sleeve (12) and having a distal end and a resilient latch (213) attached on the distal of the long section (211); and
   a short section (212) connecting with the L-shaped adjusting tube (22) and having multiple locking holes (216) longitudinally defined on the short section (212) in a line.

3. The mounting device as claimed in claim 2, wherein the L-shaped adjusting tube (22) comprises
   an insertion end (222) movably inserting into the short section (212) of the connecting tube (21) and having a resilient latch (223) to operationally engage with one corresponding locking hole (216) on the connecting tube (21); and
   an abutting end (224) being flat strip.

4. The mounting device as claimed in claim 3, wherein the resilient latch (223) comprises
   a V-strip spring accommodated inside the connecting tube; and
   a nub formed on a distal end of the V-strip spring, wherein the nub is pushed by the V-strip spring to partially emerge out of the insertion end of the L-shaped adjusting tube (22).

5. The mounting device as clamed in claim 4, wherein the mounting device further comprises a bracket (40) adapted to attach to the bottom face of the infant's safety chair between the two holding frames (10) and being also a U-shaped strip with a recess (41) and two ears (42).

6. The mounting device as clamed in claim 1, wherein the resilient latch (213) comprises
   V-strip spring (214) accommodated inside the connecting tube (21);
   a nub (215) formed on a distal end of the V-strip spring (214), wherein the nub (215) is pushed by the V-strip spring (214) to partially emerge out of the long section (211).

7. The mounting device as claimed in claim 1, wherein the mounting device further comprises a bracket (40) adapted to attach to the bottom face of the infant's safety chair between the two holding frames (10) and being also a U-shaped strip with a recess (41) and two ears (42).

* * * * *